Patented Aug. 28, 1945

2,383,812

UNITED STATES PATENT OFFICE 2,383,812

MOLD AND FABRICATION METHOD

Louis Navias, Schenectady, N. Y., assignor to General Electric Company, a corporation of New York No Drawing. Application September 9, 1942, Serial No. 457,769

7 Claims. (Cl. 22—188)

The present invention comprises an improved mold for the precision casting of metals, and a method adapted for the fabrication of molds from refractory comminuted material.

It is one of the objects of my invention to provide mold compositions comprising, besides sand or other inert refractory material mainly constituting the mold, no more than an inconsiderable proportion of bonding agent. It is another object of my invention to provide a mold having a high degree of porosity in order that gases liberated by cast metal may be readily vented. It is still another object of my invention to provide a mold which in its finished state may be readily disintegrated because of the presence of a relatively small proportion of fluxing or bonding components.

Molds made in accordance with my invention, while strong enough to be readily handled and capable of receiving cast metal without damage, are readily broken away from a completed metal casting which is embedded therein.

My invention also has for its object the fabrication of molds in which castings of refractory metals may be made to predetermined dimensions with a high degree of fidelity and with sharp configurations and smooth surfaces free from imperfections.

The above and other advantages of my invention will be made apparent from the following description, the novel features thereof being pointed out in the appended claims.

One of the chief features of novelty of my invention consists in molding composition consisting of the combination of a mold body material and a hardenable gelatinous product formed by a chemical reaction between an alcoholic solution of phosphorus pentoxide and a refractory material having alkaline properties, for example, magnesium oxide. Preferably such gelatinous bonding material is formed in situ dispersed throughout the mold mass and is hardened in situ as will be described.

My invention is applicable to the fabrication of molds from various refractory materials, including silica, alumina, zirconia, zircon and the like. Such molds are adapted for the production of metals of relatively high melting point, as, for example, stainless steel alloys of the nickel-chromium type.

In accordance with my invention comminuted silica or other chosen material, preparatory to the preparation of the mold is associated with a relatively small proportion of an alkaline earth material such as an oxide of magnesium, calcium, barium, strontium or the like. The alkaline earth material may constitute about 5 per cent of the main mold material, although a wide variation is permissible. The alkaline material may constitute 1 to 20 per cent, and even a higher proportion, of the main body material. Preferably it should be in an extremely fine state of division when it is mixed with the comminuted main mold material. Chemically precipitated or finely ground prefused alkaline earth oxide may be added depending on the rate of gelation which is desired.

To this mixture is added a solution of phosphorus pentoxide in an alcohol, preferably a saturated aliphatic alcohol which ordinarily should not contain more than five carbon atoms in the molecule. Ethyl, methyl, propyl (isopropyl) alcohols are preferred as solvents. Butyl and secondary amyl alcohols can be used as solvents for the phosphorus pentoxide but are less satisfactory.

It is probable that a reaction occurs between the alcohol and the oxide of phosphorus, and that a phosphate ester is formed. Preferably an excess of alcohol is employed to dilute such ester with unreacted alcohol. The mixture of ester and alcohol, which may contain about 10 per cent of $P_2O_5$ by weight, will be referred to as alcoholic solution. If desired, this solution may contain also organic solvents, such as acetone and some water. The content of $P_2O_5$ is not critical.

Sufficient alcoholic solution is mixed with the solids to form a mushy mass, which ordinarily has the consistency of a liquid slip. In some cases thicker semi-solid, moldable products may be desirable. This mold composition preferably is degassed by exposure to a vacuum in a closed chamber.

The degassed composition is poured or packed around a suitable pattern or form of the article to be fabricated of refractory metal. For example, a pattern consisting of a replica in wax of the article desired to be made by casting is embedded in the slip.

On the surface of the wax pattern there may be present an oily film which should be removed, for example as by treating the wax form with denatured alcohol. The wax pattern preferably is provided with a surface coating of finely divided flint which conveniently is deposited by spraying, dipping or otherwise. A suitable spray coat can be prepared by suspending the finely divided flint in an aqueous starch solution to which has been added a small amount of sodium silicate and ethylene glycol. The starch solution may be prepared by heating two grams of cornstarch in 100 cc. of water until the starch has been thoroughly dispersed in water. A small amount of commercial wetting agent, such as Aerosol (dioctyl sodium sulphosuccinate) advantageously may be present in the water to facilitate thorough wetting of the wax form by the suspension. The finely divided flint should be used in such amount as to give a thick cream which can be sprayed readily. A few per cent of sodium silicate and about 1 per cent of ethylene glycol, if present, will improve the suspension. Such a spray coat should be allowed to dry thoroughly before enveloping the wax pattern with the described mold mixture of finely divided refractory material and bonding agent.

The slip having the wax pattern embedded therein preferably is subjected to mechanical vibration to expel trapped air. The gel bond sets in about half an hour, more or less depending on various conditions, such as the grain size, concentration of ingredients, and the like. The mold and embedded pattern are allowed to stand for a number of hours, conveniently over night. They are then heated slowly to about 110° C. to drive out volatile matter and melt the wax pattern. Assuming the mold to be inverted the fused wax of the pattern flows out, leaving a mold cavity. In order to cause the mold to be most completely hardened and consolidated it is finally fired at a temperature of about 850 to 900° C. for about an hour or more.

The fused metal or alloy desired to be cast then may be introduced, preferably under pressure.

After the cast metal has solidified, the mold is broken away and excess metal is trimmed from the completed casting. It is important that mold shall not resist disintegration to the extent of damaging the casting by the process of removing the mold material.

What I claim as new and desire to secure by Letters Patent of the United States is:

1. The method of making a settable refractory mold composition which consists in dissolving phosphorus pentoxide in ethyl alcohol, mixing said solution with a comminuted inert refractory oxide and magnesia whereby a chemical reaction occurs with the formation of a gelatinous bond and forming a mold from the mixture of refractory oxide and said bond.

2. The method of fabricating a mold for metal casting which consists in associating a mixture of comminuted magnesium oxide and comminuted refractory mold material with a solution of phosphorus pentoxide in an alcohol in such proportions that a settable slip is formed, embedding a pattern consisting of easily fusible material in said slip, allowing said slip to set and dry, heating to remove said form by fusion and firing the resulting mold at a temperature of about 850° C.

3. A mold composition composed mainly of comminuted refractory material and a binder therefor comprising the gelatinous reaction product of an alcoholic solution of phosphorus pentoxide and magnesia.

4. A mold composition comprising mainly comminuted refractory material, about 1 to 20 per cent by weight of magnesia and a sufficient amount of alcoholic solution of phosphorus pentoxide to produce by reaction with said magnesia a hardenable gelatinous material which is capable of bonding said refractory material into a coherent state of sufficient strength to receive a highly heated fluid metal, while being readily disintegrated when the cast metal has set from fusion.

5. A composition for making precision molds for receiving cast metal which consists of a comminuted inert filler and a reaction product of an alkaline earth material and an alcoholic solution of phosphorus pentoxide.

6. A mold for receiving cast metal consisting of a heat-hardened product of the composition defined by claim 5.

7. The method of fabricating a mold for metal casting which consists in associating a mixture of comminuted magnesium oxide and comminuted refractory mold material with a solution of phosphorus pentoxide in an alcohol in such proportions that a settable slip is formed, embedding a pattern consisting of easily fusible material in said slip, allowing said slip to set and dry, heating to remove said form by fusion and firing the resulting mold to harden said mold.

LOUIS NAVIAS.